United States Patent
Taoka

(10) Patent No.: US 9,019,404 B2
(45) Date of Patent: Apr. 28, 2015

(54) IMAGE PROCESSING APPARATUS AND METHOD FOR PREVENTING IMAGE DEGRADATION

(75) Inventor: Mineki Taoka, Kanagawa (JP)

(73) Assignee: Samsung Electronics Co., Ltd (KR)

( * ) Notice: Subject to any disclaimer, the term of this patent is extended or adjusted under 35 U.S.C. 154(b) by 515 days.

(21) Appl. No.: 13/328,596

(22) Filed: Dec. 16, 2011

(65) Prior Publication Data

US 2012/0154640 A1    Jun. 21, 2012

(30) Foreign Application Priority Data

Dec. 20, 2010    (JP) ................................ 2010/283454
Nov. 18, 2011    (KR) ........................ 10-2011-0120907

(51) Int. Cl.
*H04N 5/262*    (2006.01)
*H04N 5/217*    (2011.01)
*H04N 5/232*    (2006.01)

(52) U.S. Cl.
CPC ............ *H04N 5/217* (2013.01); *H04N 5/23229* (2013.01)

(58) Field of Classification Search
USPC ...................................... 348/240.99
See application file for complete search history.

(56) References Cited

U.S. PATENT DOCUMENTS

2005/0008259 A1 *   1/2005   Kondo et al. ................. 382/299

FOREIGN PATENT DOCUMENTS

| JP | 2004-260265 | 9/2004 |
| JP | 2010-153942 | 7/2010 |
| JP | 2010153932 | 7/2010 |

* cited by examiner

*Primary Examiner* — Usman Khan
(74) *Attorney, Agent, or Firm* — The Farrell Law Firm, P.C.

(57) ABSTRACT

Provided is an image processing apparatus and method which allows high-speed image processing and prevents the field-of-view rate from being degraded due to pixel reduction by the number of ring pixels.

10 Claims, 6 Drawing Sheets

IMAGE PROCESSING APPARATUS AND METHOD FOR PREVENTING IMAGE DEGRADATION

PRIORITY

This application claims priority under 35 U.S.C. §119(a) to a Japanese Patent Application filed in the Japan Patent Office on Dec. 20, 2010 and assigned Serial No. JP 283454/2010, and to a Korean Patent Application filed in the Korean Intellectual Property Office on Nov. 18, 2011 and assigned Serial No. 10-2011-0120907, the contents of each of which are incorporated herein by reference.

BACKGROUND OF THE INVENTION

1. Field of the Invention

The present invention relates to an image processing apparatus and method for preventing degradation in field-of-view rate due to pixel reduction by the number of ring pixels when image processing is performed.

2. Description of the Related Art

Conventionally, for Bayer data (original image data) inserted from an imaging element when an image is created by an image capturing device such as a digital camera, image processing such as conversion into YUV data, noise reduction, and image correction (e.g., edge emphasis), as well as image conversion such as enlargement, reduction, and copying, are performed.

During this image processing, the original data to be processed is input to a sequential image processing part line-by-line in a top-to-bottom order. In such image processing, a new pixel may be created by referring to a plurality of pixels. If image processing is performed without any processing on the original image data, as shown on the left side of FIG. 1, the original image data, which is size-reduced by pixels (i.e. ring pixels) around the original image data, is processed, thus obtaining image data. To prevent degradation in field-of-view rate due to size-reduction of the output image after image processing of the input image, as indicated by the dotted line on the right side of FIG. 1, a ring pixel frame over the perimeter of the original image data as many as ring pixels around the input image data lost due to image processing is provided prior to image processing (see Japanese Publication No. 2010-153932).

For the input image data, image conversion known as pixel copy, which enlarges an input image two times, may also be performed after image processing as well as image processing which outputs image data of the same number of pixels. A structure in which image processing and image conversion are performed in succession is shown in FIG. 2. The structure includes a Synchronous Dynamic Random Access Memory 4A in which the original image data is memorized, an input Direct Memory Access (DMA) 51A (hereinafter a reading part) for reading the original image data from the SDRAM 4A line-by-line, an image processing part 52A which includes a first filter 53A, a second filter 54A, and a third filter 55A which are directly connected to perform image processing with respect to a line read by the reading part 51A, an image resizing part 56A directly connected to the image processing part 52A to enlarge or copy the image-processed line, and an output DMA 58A which is an output part for memorizing the enlarged or copied line in the SDRAM 4A.

When enlarging a line such as outputting two lines for one line, the image resizing part 56A needs more time to output and memorize the lines in the SDRAM 4A than when inputting the line. If a new line is input during an output operation of the image resizing part 56A, a normal operation cannot be performed, such that a request signal for requesting a timing for inputting a line necessary for a next operation to the image resizing part 56A after completion of the output operation is input to the reading part 51A. According to the request signal, the reading part 51A reads a new line, and the read line is input to the first filter 53A, then the second filter 54A, and then the third filter 55A for image processing, after which a new line is input to the image resizing part 56A.

However, in this structure, data for a lower ring line of a ring pixel frame shown in FIG. 3 cannot be output. Specifically, when the reading part 51A reads a lower line of the original image data, since data of the lower ring line has not been memorized in the SDRAM 4A, the reading part 51A cannot perform a corresponding operation even if the request signal is input to the reading part 51A. As a result, an output operation corresponding to the lower ring line cannot continue. If the image processing part 52A is not directly connected to the image resizing part 56A to prevent such a problem, the bandwidth of the SDRAM cannot be reduced, thereby delaying image processing operations.

SUMMARY OF THE INVENTION

The present invention has been made considering the foregoing problems occurring in the prior art, and provides an image processing apparatus and method for reducing memory bandwidth and allowing high-speed image processing based on direct connection of an image resizing part to an image processing part, and simultaneously preventing degradation in field-of-view rate due to pixel reduction by the number of ring pixels.

To achieve the foregoing objects, an image processing apparatus according to the present invention includes an original image data memorizing part for storing original image data, a reading part for reading and outputting the original image data at least one line-by-line in a top-to-bottom direction, an image processing part for, upon input of the line, adding ring pixels corresponding to image processing for each input line, performing the image processing, and outputting the image-processed line, an image resizing part for, upon input of the image-processed line, performing enlargement or copy with respect to the image-processed line and outputting the enlarged or copied line, and an output timing control part for controlling timing for outputting the line from the reading part or timing for outputting the image-processed line from the image processing part.

An image processing method according to the present invention includes storing original image data, reading and outputting the original image data at least one line-by-line in a top-to-bottom direction, adding, upon input of the line, ring pixels corresponding to image processing to each input line, performing the image processing with respect to the input line, and outputting the image-processed line, performing, upon input of the image-processed line, enlargement or copy with respect to the image-processed line and outputting the enlarged or copied line, and controlling timing for outputting the line during the reading step or timing for outputting the image-processed line.

BRIEF DESCRIPTION OF THE DRAWINGS

The above and other features and advantages of an embodiment of the present invention will be more apparent from the following detailed description taken in conjunction with the accompanying drawings, in which.

DETAILED DESCRIPTION OF AN EMBODIMENT OF THE INVENTION

Hereinafter, an embodiment of the present invention will be described with reference to the accompanying drawings. In the following description, a detailed description of known functions or configurations incorporated herein will be omitted for the sake of clarity and conciseness.

Figure 4:
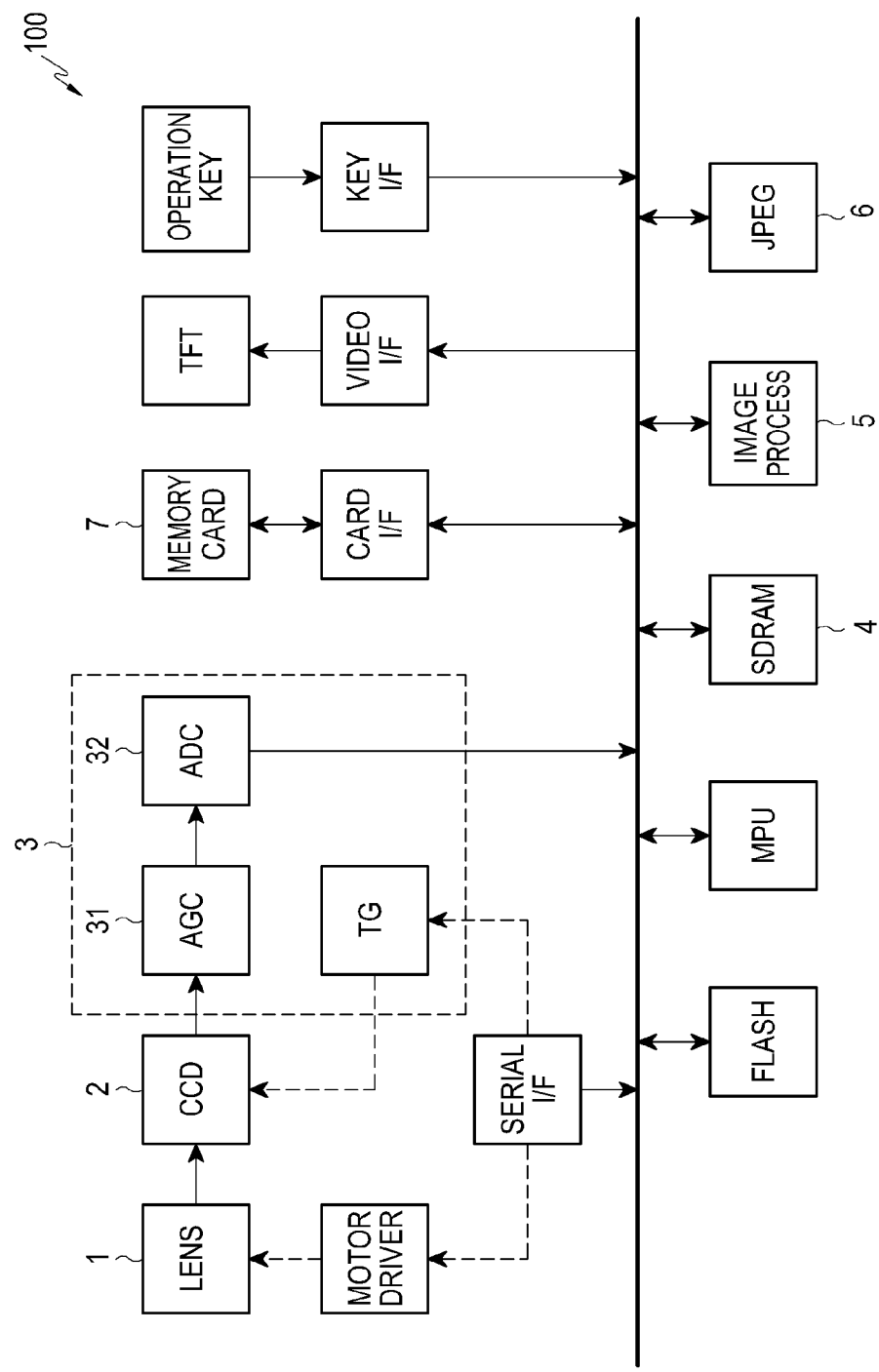
FIG. 4 illustrates an entire structure of a digital camera having mounted thereon an image processing apparatus according to an embodiment of the present invention.

Hereinafter, an image processing apparatus 200 shown in FIG. 5 according to an embodiment of the present invention will be described. The image processing apparatus 200 is mounted on the digital camera 100 shown in FIG. 4, and is configured to perform image processing in conversion of Bayer data created by an imaging element into YUV data, and perform image conversion processing such as enlargement and copy.

Figure 1:
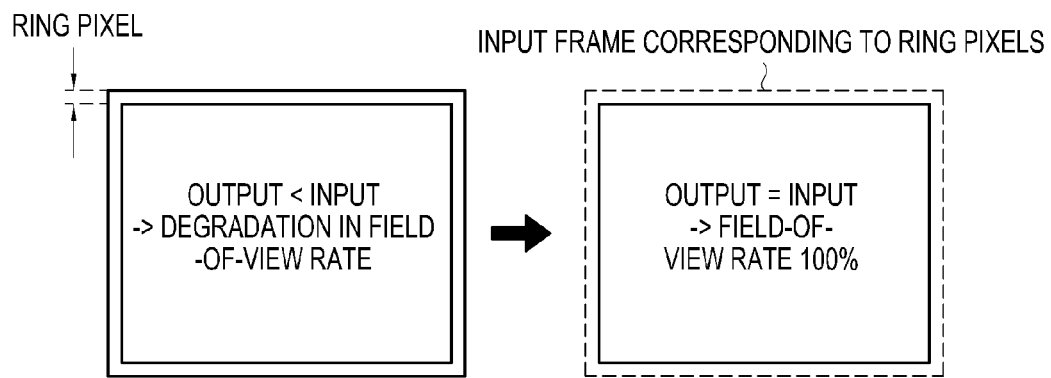
FIG. 1 illustrates conventional degradation in field-of-view rate due to pixel reduction by the number of ring pixels.

In the digital camera 100, as shown in FIG. 1, an object is imaged on a Charge Coupled Device (CCD) 2 through a lens 1 and the image is delivered as an electric signal to an Analog-Front End (AFE) 3. In the AFE 3, the signal is amplified by an Automatic Gain Control (AGC) 31, and then converted into a digital signal by an Analog-to-Digital Converter (ADC) 32.

The image (Bayer data) converted into the digital signal is stored in a memory such as the SDRAM 4.

The image of the Bayer data stored in the memory is converted into a YUV image in an image processor 5, and then delivered to an image compressing pat 6 in which the image will be encoded into, for example, a Joint Photographic Experts Group (JPEG) format. The encoded compressed image is stored in a memory card 7.

Herein, the image processor 5 corresponds to an image processing part 52 and an image resizing part 56 shown in FIG. 2 as will be described in detail below.

Figure 2:
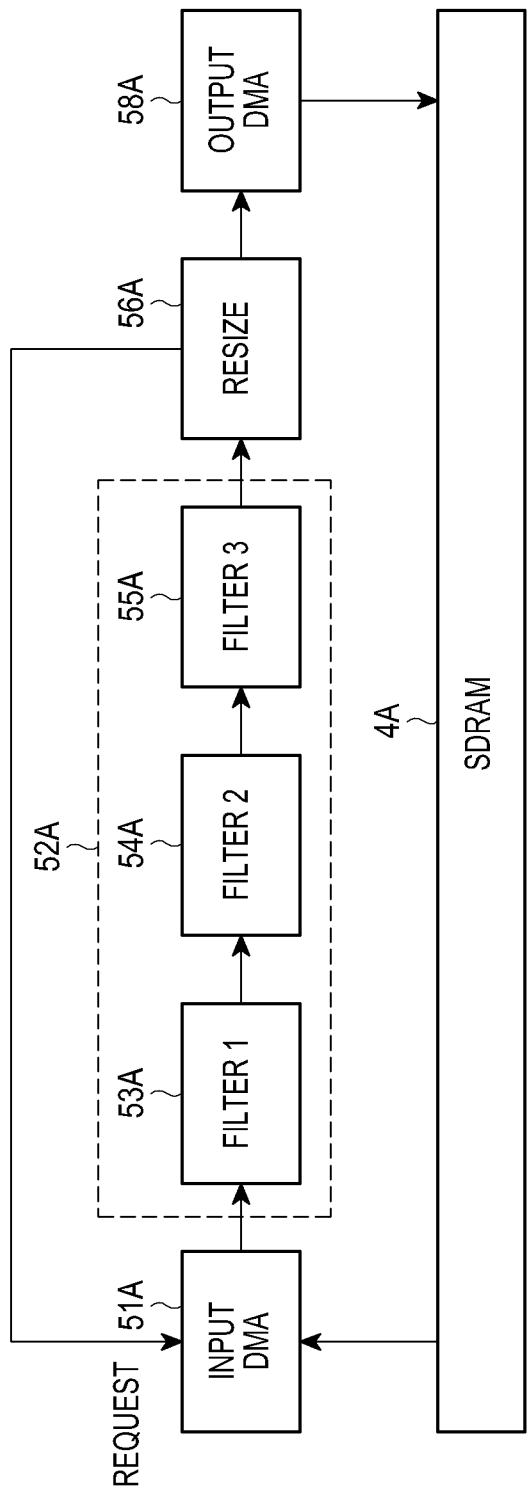
FIG. 2 illustrates a conventional example of image processing when a ring pixel frame is provided in an original image.

As shown in FIG. 2, the image processing apparatus 200 is configured to function as the SDRAM 4 which is an original image data memorizing part (which will hereinafter be referred to as the original image data memorizing part), an input DMA 51, the image processing part 52, the image resizing part 56, a request control 57 which is an output timing control part (hereinafter the output timing control part), and an output DMA 58.

In the original data memorizing part 4 is stored the original image data. More specifically, in the original data memorizing part 4 is stored Bayer data, which is an image obtained by converting the converted image signal of the object from the CCD 2 into the digital signal by the AFE 3.

The input DMA 51, which corresponds to a reading part, accesses the original image data memorizing part 4 without passing through a Micro Processor Unit (MPU), thereby inputting the original image data into the image processing part 52 to be described below. The input DMA 51, upon receiving a request from the output timing control part (or request control) 57, reads the original data line-by-line or lines-by-lines in a top-to-bottom direction, and outputs the read line(s) to the image processing part 52.

The image processing part 52 performs image processing with respect to the line read by the input DMA 51, and outputs the image-processed line to the subsequent image resizing part 56. The image processing part 52 includes three filters which sequentially perform operations, for example, a first filter 53 (Filter1) which performs conversion from Bayer data into YUV data, a second filter 54 (Filter2) which performs noise reduction, and a third filter 55 (Filter3) which performs correction of edge emphasis. The three filters are directly connected in series, and data output from each filter is directly input for subsequent processing to the next filter. Processing for forming a pixel based on a plurality of pixels is performed in each filter and, to prevent reduction of pixels when processing with respect to the input image, ring pixels are added to an input line. Herein, a lower line of the ring pixels will be referred to as a lower ring line. In addition, the number of lower ring lines added in each of the first filter 53, the second filter 54, and the third filter 55 is assumed to be L1, L2, and L3, respectively. In each filter, a storage area for memorizing lines of a number necessary for processing is formed in the original image data memorizing part 4.

The image resizing part 56 is directly connected to the image processing part 52, and the image resizing part 56 enlarges the input line and outputs the enlarged line. For example, the image resizing part 56 outputs two lines with respect to one input line, and the output lines are stored in the original image data memorizing part 4 by the output DMA 58.

The output timing (Request) control part 57 observes the number of lines output from the third filter 55 to control timing for inputting a line to the image resizing part 56. Such timing control is intended to prevent a new line from being input to the image resizing part 56 until the image resizing part 56 completes output when the image resizing part 56 enlarges or copies a line. The output timing control part 57 is configured to control timing for outputting a line for the input DMA 51 and each filter of the image processing part 52.

The output timing control part 57 controls the output timing of the reading part until the reading part corresponding to the input DMA 51 reads all the lines of the original image data, after which the output timing control part 57 controls the output timing of the image processing part 52.

More specifically, the output timing control part 57 does not perform a control operation when the image resizing part 56 performs reduction processing, i.e., outputs lines of a smaller number than the number of input lines. In this case, lines are input continuously since there is no waiting for input to the image resizing part 56, and a block of each filter detects absence of a line to be input and inputs each lower ring line to the next filter or the image resizing part 56. That is, the first filter 53 inputs L1 lower ring lines to the second filter 54.

When the image resizing part 56 performs enlargement or copy, i.e., outputs one or more lines with respect to one input line, the output timing control part 57 controls timing for reading a line and outputting the read line by the input DMA 51 until all the lines of the original image data stored in the original image data memorizing part 4 are output. More specifically, when it is detected that the image resizing part 56 completes output, the output timing control part 57 generates a request for requesting the input DMA 51 to read the next line.

Thereafter, according to a ring pixel frame added in each filter, the output timing control part 57 generates requests for requesting the first filter 53, the second filter 54, and then the third filter 55 to sequentially output their respective lower ring lines in that order so as to input the respective lower ring lines to the image resizing part 56. To determine the order of requests, assuming that the number of input lines dividing the original image data is A, the number of lines output up to now from the third filter 55 is B, and the numbers of lower ring lines of the respective filters are L1, L2, and L3, respectively. When the number of output lines B is in a range of A−(L1+L2+L3)≤B<A−(L2+L3), the output timing control part 57 generates a request for requesting the first filter 53 to sequentially output lower ring lines in a top-to-bottom direction. When the number of output lines B is in a range of A−(L2+L3)≤B<A−L3, the output timing control part 57 generates a request for requesting the second filter 54 to sequentially output lower ring lines in a top-to-bottom direction. When the number of output lines B is in a range of A−L3≤B<A, the output timing control part 57 generates a request for requesting the third filter 55 to sequentially output lower ring lines in a top-to-bottom direction.

Figure 3:
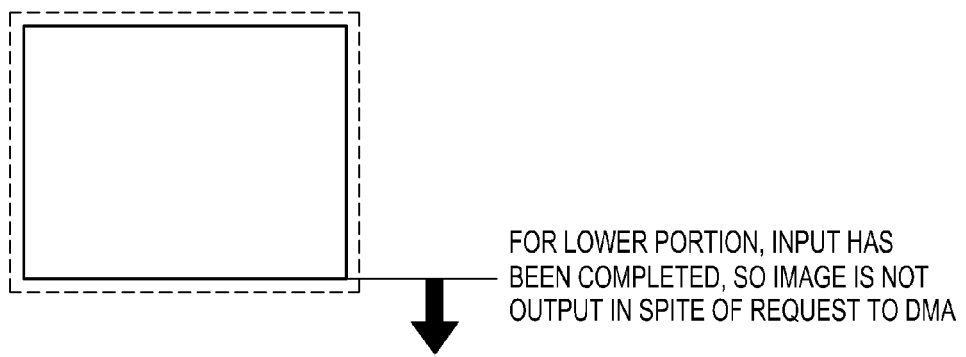
FIG. 3 illustrates a conventional problem occurring in the embodiment shown in FIG. 2.

As the output timing control part 57 operates in this manner, a timing chart for the input timing and input/output timing for each filter is as shown in FIG. 3.

As such, with the image processing apparatus 200 according to an embodiment of the present invention, a ring pixel frame is provided and, simultaneously, an output after processing of each filter of the image processing part 52 is directly input to the image resizing part 56 which, for example, performs enlargement processing. Therefore, even when the original image is image-processed and then resized into an enlarged image, the field-of-view rate of the enlarged image is not degraded and the bandwidth of the original image data memorizing part 4 is reduced, thus achieving high-speed processing with limited power consumption.

As described above, according to the present invention, even after the reading part reads all the lines of the original image data from the original image data memorizing part, the image processing part may be requested to output a line, and the image resizing part may also output lines corresponding to ring pixels added in the image processing part. In addition, since output timing is also controlled, even when one or more lines are output with respect to one input line for enlargement or copy, a situation may be prevented in which a normal operation cannot be performed due to a new input during the output operation. Moreover, the image resizing part which is serially connected directly to the image processing part is provided, such that it is not necessary to read the processing result of the image processing part, which is stored in the memory, for image resizing, thereby reducing the bandwidth of the memory and thus allowing high-speed processing. As such, with the image processing apparatus and method according to the present invention, high-speed image processing is achieved and degradation in the field-of-view rate due to pixel reduction by the number of ring pixels is prevented.

Figure 5:
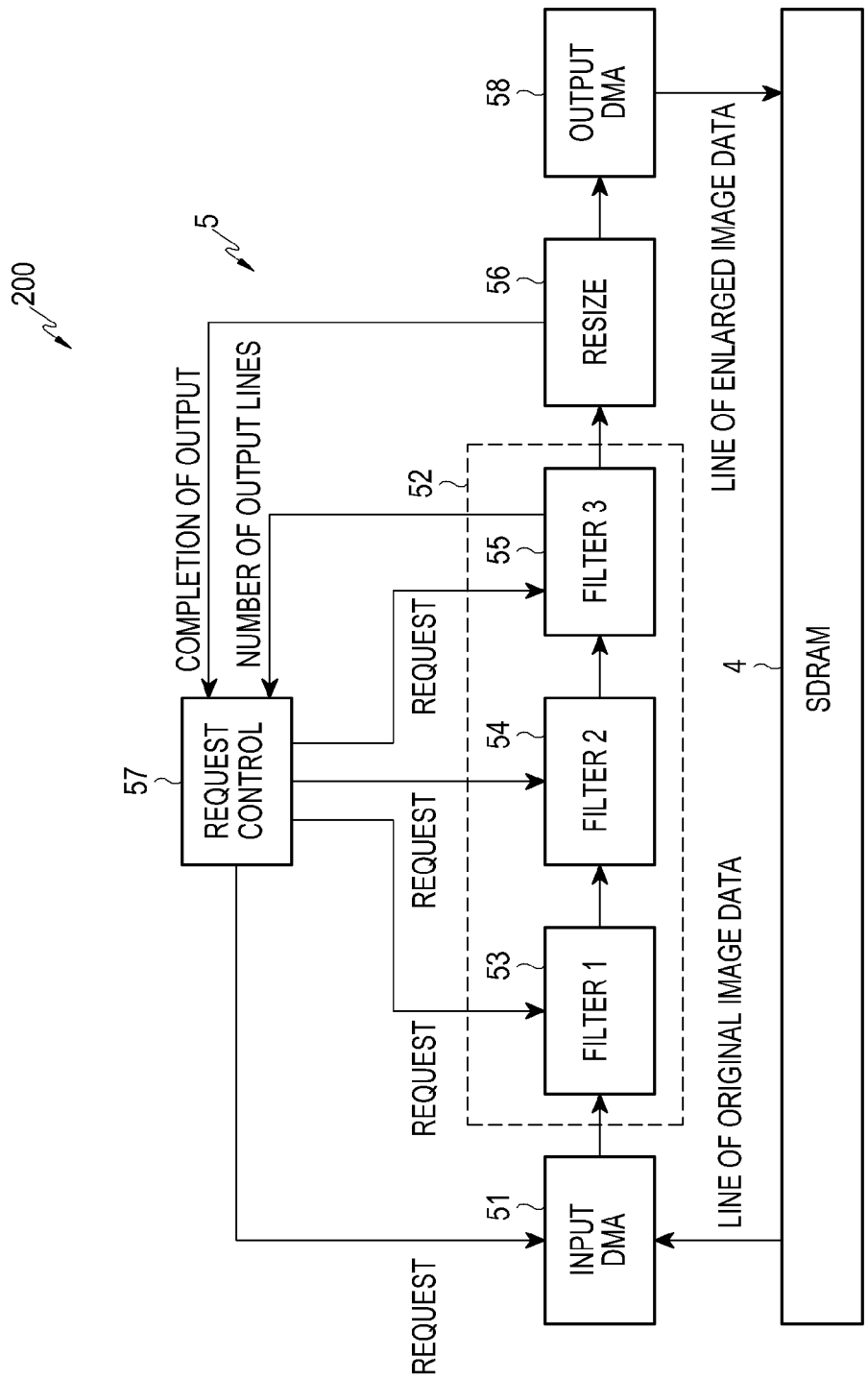
FIG. 5 illustrates an image processing apparatus according to an embodiment of the present invention.
Figure 6:
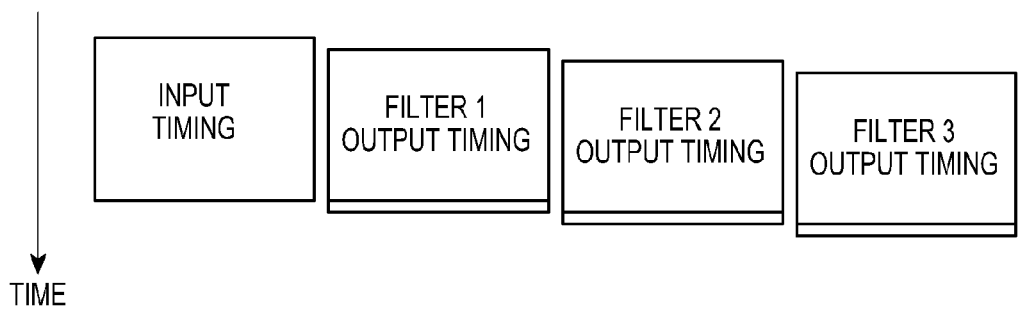
FIG. 6 illustrates image processing according to an embodiment of the present invention.

While image processing has been performed using a plurality of filters in the foregoing embodiment of the present invention, the number of filters is not limited to that shown in FIG. 5, and may be larger than the number of filters shown in FIG. 5 or may be one. That is, any number of filters is possible as long as the image resizing part is directly connected to the image processing part. Furthermore, the image processing apparatus according to the present invention can also be mounted on any image processing device as well as the digital camera.

In addition, various modifications or a combination of embodiments are also possible in a manner that does not depart from the objects of the present invention.

While the invention has been shown and described with reference to an embodiment thereof, it will be understood by those skilled in the art that various changes in form and details may be made therein without departing from the scope of the invention as defined by the appended claims and their equivalents.

What is claimed is:

1. An image processing apparatus comprising:
   an original image data memorizing part for storing original image data;
   a reading part for reading and outputting the original image data at least one line-by-line in a top-to-bottom direction;
   an image processing part for, upon input of the at least one line,
      adding ring pixels corresponding to image processing for each input line,
      performing the image processing, and
      outputting the image-processed line;
   an image resizing part for, upon input of the image-processed line,
      performing enlargement or copy with respect to the image-processed line; and
      outputting the enlarged or copied line; and
   an output timing control part for controlling timing for outputting the line from the reading part or outputting the image-processed line from the image processing part
   wherein the output timing control part determines the timing by using the number of input lines dividing the original image data, the number of output lines output from the at least one filter, and the number of lower ring lines of ring pixels in the respective at least one filters.

2. The image processing apparatus of claim 1, wherein the output timing control part controls the output timing of the reading part until all lines of the original image data are read by the reading part, and controls the output timing of the image processing part after all the lines of the original image data are read by the reading part.

3. The image processing apparatus of claim 2, wherein when detecting that output from the image resizing part is completed as all the lines of the original image data are read by the reading part, the output timing control part generates a request for requesting the reading part to read a next line.

4. The image processing apparatus of claim 1, wherein the reading part is a Direct Memory Access (DMA) which, when receiving a request from the output timing control part, reads the original image data stored in the original image data memorizing part line-byline or lines-by-lines in a top-to-bottom direction, and outputs the read line or lines to the image processing part.

5. The image processing apparatus of claim 1, wherein the image resizing part is directly connected to the image processing part in series.

6. The image processing apparatus of claim 1, wherein the image processing part comprises at least one filter.

7. An image processing method comprising:
   an original image data storing step of storing original image data;
   a reading step for reading and outputting the original image data at least one line-by-line in a top-to-bottom direction;
   an image processing step of, upon input of the at least one line,
      adding ring pixels corresponding to image processing to each input line,
      performing the image processing with respect to the input line, and
      outputting the image-processed line;

an image resizing step of, upon input of the image-processed line,
  performing enlargement or copy with respect to the image-processed lin; and
  outputting the enlarged or copied line; and
an output timing control step of controlling timing for outputting the line during the reading step or timing for outputting the image-processed line
wherein the output timing control step comprises determining the timing by using the number of input lines dividing the original image data, the number of output lines output from the at least one filter, and the number of lower ring lines of ring pixels in the respective at least one filters.

8. The image processing method of claim 7, wherein the output timing control step comprises:
  controlling the output timing of the reading part until all lines of the original image data are read; and
  controlling the output timing of the image processing part after all the lines of the original image data are read.

9. The image processing method of claim 8, wherein controlling the timing for outputting the line during the reading step comprises, when detecting that output of the line obtained by performing enlargement or copy with respect to the image-processed line is completed, generating a request for reading a next line during the reading step.

10. The image processing method of claim 7, wherein the image processing step comprises outputting the image-processed line by using at least one filter.

* * * * *